United States Patent
Herfst et al.

(10) Patent No.: US 11,592,460 B2
(45) Date of Patent: Feb. 28, 2023

(54) SCANNING PROBE MICROSCOPE, SCAN HEAD AND METHOD (71) Applicant: Nederlandse Organisatie voor toegepast-natuurwetenschappelijk onderzoek TNO, 's-Gravenhage (NL)

(72) Inventors: Roelof Willem Herfst, Capelle aan den Ussel (NL); Hamed Sadeghian Marnani, Nootdorp (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 4 days.

(21) Appl. No.: 17/299,431

(22) PCT Filed: Dec. 3, 2019

(86) PCT No.: PCT/NL2019/050804
§ 371 (c)(1),
(2) Date: Jun. 3, 2021

(87) PCT Pub. No.: WO2020/117056
PCT Pub. Date: Jun. 11, 2020

(65) Prior Publication Data
US 2022/0057430 A1    Feb. 24, 2022

(30) Foreign Application Priority Data
Dec. 4, 2018 (EP) .................................... 18210229

(51) Int. Cl.
*G01Q 20/04*    (2010.01)
*G01Q 10/04*    (2010.01)
(Continued)

(52) U.S. Cl.
CPC ........... *G01Q 20/04* (2013.01); *G01Q 10/045* (2013.01); *G01Q 30/10* (2013.01); *G01Q 70/04* (2013.01)

(58) Field of Classification Search
CPC ...... G01Q 20/04; G01Q 10/045; G01Q 30/10; G01Q 70/04
(Continued)

(56) References Cited

U.S. PATENT DOCUMENTS 5,417,312 A * 5/1995 Tsuchitani ............ G01P 15/125
                                                         303/181
7,395,698 B2    7/2008 Degertekin
(Continued)

FOREIGN PATENT DOCUMENTS

WO    WO 2012/064193 A1    5/2012

OTHER PUBLICATIONS

European Patent Office, International Search Report in corresponding International Application No. PCT/NL2019/050804, dated Feb. 27, 2020 (3 pages).
(Continued)

*Primary Examiner* — Nicole M Ippolito
(74) *Attorney, Agent, or Firm* — Leydig, Voit & Mayer, Ltd.

(57) ABSTRACT

The present invention relates to a scan head for a scanning probe microscope arranged for moving a probe including a conductive cantilever relatively to a substrate surface, the head comprising: a first electrode positioned such that a capacitor is formed across a gap between the first electrode and a second electrode, wherein the second electrode is formed by the conductive cantilever; a voltage source for actuating the conductive cantilever by applying a voltage to the capacitor; and at least a first resistor arranged in series between the voltage source and one of the first and second
(Continued)

electrodes such as to form an RC circuit for damping a vibration of the cantilever.

20 Claims, 5 Drawing Sheets

(51) Int. Cl.
*G01Q 30/10* (2010.01)
*G01Q 70/04* (2010.01)

(58) Field of Classification Search
USPC .......................... 850/1, 2, 3, 4, 5, 6, 7, 8, 9
See application file for complete search history.

(56) References Cited

U.S. PATENT DOCUMENTS

| | | | |
|---|---|---|---|
| 7,441,447 | B2 | 10/2008 | Degertekin et al. |
| 8,769,710 | B2 | 7/2014 | Moon et al. |
| 9,869,695 | B1 | 1/2018 | Drechsler et al. |
| 2006/0283338 | A1 | 12/2006 | Degertekin |
| 2007/0012094 | A1 | 1/2007 | Degertekin et al. |
| 2008/0315092 | A1* | 12/2008 | Kley .................. G03F 7/70616 250/307 |
| 2019/0162600 | A1* | 5/2019 | Komenko ............... H01L 31/18 |

OTHER PUBLICATIONS

Christian J. Long et al., "Modular apparatus for electrostatic actuation of common atomic force microscope cantilevers," Review of Scientific Instruments, vol. 86, No. 7, pp. 073703-073703-9, XP012199301 (Jul. 27, 2015).

J. Brugger et al., "Microlever with combined integrated sensor/actuator functions for scanning force microscopy," Sensors and Actuators A, No. 43, pp. 339-345, XP026615755 (May 1, 1994).

E.K. Chan et al., "Effects of capacitors, resistors and residual charge on the static and dynamic performance of electrostatically-actuated devices," Center for Integrated Systems, Stanford University, Stanford, CA (11 pages).

Sunil Rana et al., "An electrostatically actuated cantilever device capable of accurately calibrating the cantilever on-chip for AFM-like applications," IOP Science (3 pages) retrieved from the Internet May 21, 2020, at: https://iopscience.iop.org/article/10.1088/0960-1317/19/4/045012/pdf.

Eihab M. Abdel-Rahman et al., "Characterization of the mechanical behavior of an electrically actuated microbeam," IOP Science (3 pages) retrieved from the Internet May 21, 2020, at: https://iopscience.iop.org/article/10.1088/0960-1317/12/6/306/pdf.

Eihab M. Abdel-Rahman et al., "Characterization of the mechanical behavior of an electrically actuated microbeam," Institute of Physics Publishing, Journal of Micromechanics and Microengineering, No. 12, pp. 759-766 (2002).

R. Vermeer et al., "Electrostatically Actuated Double Cantilever AFM Probe for High Speed Imaging," Mesa + Institute for Nanotechnology, University of Twente, Enschede, The Netherlands, pp. 912-915 (2013).

Sunil Rana et al., "An electrostatically actuated cantilever device capable of accurately calibrating the cantilever on-chip for AFM-like applications," Institute of Physics Publishing, Journal of Micromechanics and Microengineering, No. 19, 045012, pp. 1-12 (2009).

* cited by examiner

SCANNING PROBE MICROSCOPE, SCAN HEAD AND METHOD

CROSS-REFERENCE TO RELATED APPLICATIONS

This patent application is a U.S. National Phase of PCT International Application No. PCT/NL2019/050804, filed Dec. 3, 2019, which claims priority to European Application No. 18210229.3, filed Dec. 4, 2018, which are both expressly incorporated by reference in their entireties, including any references contained therein.

The present disclosure relates to the field of Scanning Probe Microscopy (SPM), scan heads as well as methods for probing the surface of a sample substrate by moving a probe including a cantilever relative to said substrate. More particularly, the present disclosure relates to scan heads and methods for moving a probe including a conductive cantilever relative to the surface of a sample substrate using electrostatic forces. Furthermore the present disclosure relates to SPMs, probe holders, and assemblies of scan heads and probes.

BACKGROUND

SPM includes atomic force microscopy (AFM) and its variations relate to measurement methods that allow for the probing of a wide range of surface properties including surface topography, and various physical and mechanical properties. These include, but are not limited to, local stiffness, elasticity, friction, magnetic, electric and other properties. Typically, in scanning probe microscopy a flexible cantilever including a sharp probe tip is brought into proximity to the surface of a sample to be probed. By detecting the cantilever position, the extent of these forces between tip and cantilever may be determined. By closing a feed-back loop the vertical position of the cantilever may be controlled based on the observed deflection signals.

A disadvantage of known conventional scanning methods is that these are comparatively slow when compared to other surface characterization methods such as electron microscopy. This is on one hand due to the scanning nature of SPM methods which require a scanning motion of the cantilever, sequentially addressing all regions of interest of the sample. On the other hand, scanning speed is limited by the requirement of SPM methods to have the probe tip follow the surface topology as closely, or accurately as possible. A first factor contributing to the limited scanning speed of SPM method relates to the limited response speed of the actuator, typically a vertical piezo electric element, controlling the distance between cantilever and substrate. By reducing the scanning speed, the actuator is left with more time to allow the probe tip to accurately follow the features of the sample. A further factor contributing to the limited scan speed of SPM methods is related to either unwanted cantilever oscillations or the slow rate with which wanted cantilever oscillations change. Unwanted oscillations may, for example, be caused by instantaneous snap-off events between cantilever and substrate causing a cantilever to ring, or oscillate. Such events may for example occur, when the actuator is driven to increase the distance between sample and cantilever. Typically, there exists a certain amount of adhesive forces, e.g. stickiness or water tension, between the probe tip and sample surface. So in order to lift the probe tip from the sample, the cantilever must build up enough energy to overcome these adhesive forces. Once sufficient energy is built up, the probe tip will snap off and the cantilever will start vibrating until the oscillations decay through natural damping. This damping process may last a relatively long time when the cantilever is operating in air because air has a relatively low damping coefficient. As a result, scan speed must be reduced to allow for sufficient damping in order to avoid these vibrations from influencing subsequent measurement runs. Similarly, vibrations or ringing, may be observed during a scanning motion along a sample surface having large pronounced steps in surface properties, e.g. a large depressions, or pronounced spikes. In such case the tip may lose contact with the substrate, or crash into the substrate, respectively, which mat both leave the cantilever in an oscillating state. These problems are further especially pronounced under low pressure conditions, e.g. under vacuum, where damping is even slower. While this tends to increase the sensitivity of the SPM tool, it also becomes much slower. Excessive cantilever vibrations should further be reduced since cantilever vibration may potentially damage the substrate and/or probe tip. In contrast, liquid media, e.g. water, are much more suited for damping of cantilever vibrations. However, not all samples, cantilevers, SPM tools and/or measurement modes are suited for operation under liquid conditions.

Accordingly, there exists a general need for techniques to address the vibrations or ringing of cantilevers in order to improve the speed of probe scanning and/or to improve the speed of generating force-distance curves. In other words there exists a general need for providing an SPM system having a cantilever with decreased Q, for example in SPM methods and devices that intend to measure samples in gaseous atmosphere (although not particularly limited thereto).

U.S. Pat. No. 8,769,710 discloses an atomic force microscope (AFM) and a method of operating an AFM system wherein unwanted vibrations are actively damped. However said method requires both the detection of unwanted vibrations as well as the active damping of these vibrations by applying a control signal to an actuator to counteract these vibrations. In other words, in the system of U.S. Pat. No. 8,769,710 vibrations in the cantilever are damped by applying active counter vibrations. Although the method of U.S. Pat. No. 8,769,710 allows for faster damping of unwanted oscillations in cantilevers the system is still limited by the response speed of the control loop to detect and counteract the vibrations. Further, active damping has limited effectivity and typically some residual oscillations remain. In other words, the method of U.S. Pat. No. 8,769,710 has limited effectivity in providing reduced Q-factors. Further, the method of U.S. Pat. No. 8,769,710 relies on the availability of a transducer to dampen unwanted oscillations and is accordingly limited by the quality and response speed of this actuator.

SUMMARY OF THE INVENTION

It is an object of the present invention to enable probing of a sample surface using a cantilever with enhanced damping. In particular probing of a sample surface using a cantilever with enhanced damping in a scanning probe microscope.

To this end, in accordance with a first aspect, there is provided a scan head for a scanning probe microscope arranged for moving a probe including a conductive cantilever relatively to a substrate surface. The scan head comprises: a first electrode positioned such that a capacitor is formed across a gap between the first electrode and a second electrode, wherein the second electrode is formed by the conductive cantilever; a voltage source for actuating the conductive cantilever by applying a voltage to the capacitor; and at least a first resistor arranged in series between the voltage source and one of the first and second electrodes such as to form an RC circuit for damping a vibration of the cantilever.

In a preferred embodiment, the resistor is arranged to provide a RC time suited to enhance damping of the cantilever. Improving the damping of the cantilever will reduce the Q-factor, e.g. increase the cantilever bandwidth. It will be appreciated that cantilever bandwidth varies between cantilevers, for example between cantilevers having differing stiffness. Therefore, in another or further preferred embodiment the resistance of the resistor is preferably adjustable. For this purpose the first resistor preferably is a tunable resistor. Alternatively, or in addition the first resistor may be a switchable resistor comprising an array of selectable resistors. By providing a resistor with an adjustable resistance, the resistance may be adjusted according to the properties, e.g. stiffness and/or dimension, of the cantilever to be used.

In another or further preferred embodiment the scan head further comprises a diode and second resistor arranged parallel to the first resistor. By providing the RC circuit with a diode and second resistor arranged parallel to the first resistor damping may be directional.

According to a second aspect the present disclosure relates to a method for moving a probe including a conductive cantilever relatively to a substrate surface. The method comprises: positioning a first electrode such that a capacitor is formed across a gap between the first electrode and a second electrode, wherein the second electrode is formed by the conductive cantilever; applying a voltage to the capacitor for actuating the conductive cantilever; and providing at least a first resistor arranged in series between the voltage source and one of the first and second electrodes such as to form an RC circuit for damping a vibration of the cantilever.

In preferred embodiments the head and/or method further comprise choosing, setting or selecting the resistance of the first resistor such that the characteristic RC time matches a resonance frequency of the cantilever, preferably by a factor within a range from 0.1 to 10 to improve damping of cantilever oscillations due to probing of step changes in said substrate surface.

In another or further preferred embodiment, the method further relates to probing the substrate surface using sub-resonant imaging with force control, wherein the method further comprises applying a voltage to the capacitor for driving the conductive cantilever towards the surface of the substrate such that the conductive cantilever deflects; measuring cantilever position; comparing the measured cantilever position with pre-recorded reference data obtained with the cantilever at a distance from the substrate with essentially zero interaction between cantilever and substrate, the data comprising the position of the cantilever as function of provided actuation voltage; calculating an applied force to the substrate using the position deviation from the reference data and a spring constant of the provided cantilever; closing a feedback loop that adjusts the voltage to control the force applied to the substrate using a force setpoint; periodically adjusting the applied force setpoint.

According to a third aspect the present invention relates to a scanning probe microscope comprising the head according to the first aspect.

According to a fourth aspect of the present invention, there is provided a probe holder for holding a conductive cantilever for use in a scanning probe microscope, the holder comprising a first electrode positioned such that a capacitor is formed across a gap between the first electrode and a second electrode, wherein the second electrode is formed by the conductive cantilever.

The present invention, in accordance with a fifth aspect, further relates to an assembly of a probe comprising a conductive cantilever and a scan head according to the invention and to a probe holder for holding a conductive cantilever for use in a scanning probe microscope, the holder comprising a first electrode positioned such that a capacitor is formed across a gap between the first electrode and a second electrode, wherein the second electrode is formed by the conductive cantilever.

BRIEF DESCRIPTION OF FIGURES

These and other features, aspects, and advantages of the apparatus, systems and methods of the present disclosure will become better understood from the following description, appended claims, and accompanying drawing wherein:

DETAILED DESCRIPTION

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

As used herein, Scanning probe microscopy (SPM) devices, such as atomic force microscopy (AFM) devices are for example applied in the semiconductor industry for scanning of semiconductor topologies on a surface. Other uses of this technology are found in biomedical industry, nanotechnology, and scientific applications. In particular, AFM may be used for critical defect metrology (CD-metrology), particle scanning, stress- and roughness measurements. AFM microscopy allows visualization of surfaces at very high accuracy, enabling visualization of surface elements at sub-nanometer resolution. Other surface scanning measurement devices for example include optical near field scanning devices.

The probe in an SPM system comprises a cantilever and a probe tip. A probe may also be referred to as a probe chip or a holder-chip. Various types of these probes (probe chips) are commercially available and typically consist of a chip part from which is at least at one end provided with one or more cantilevers, each of which are typically provided with a tip (or probe tip) that is usually located on the other end of the cantilever. The radius of the tip is usually in the scale of a few nanometers to a few tens of nanometers. On one end of the cantilever, the probe is attached to head, for example (but not necessarily) through an actuator that allows to bring the probe in motion. In SPM, the probe tip is scanned over the surface of a sample or substrate to measure the topography and mechanical properties thereof. A sensor, in many cases an optical sensor, monitors the position of the probe tip. For example, the sensor may monitor a reflected laser beam that is reflected by the cantilever or the back of the probe tip, and which changes angle when the probe tip moves up or down.

Depending on the circumstances and the type of information desired, SPM may be performed in various modes of operation. These modes include static modes, wherein the cantilever is held static while the probe tip moves perpendicular to the surface due to surface features that are encountered during scanning. Dynamic operation modes are another important class of modes, wherein the cantilever is vibrated during scanning thereof across the surface. Generally, the topography image of the surface is obtained by measuring the effects of the surface on the probe and keeping it constant by adjusting the height of the probe using a feed back loop and a piezoelectric actuator. The height of the probe is then monitored, and from this, the topography can be obtained. A number of different modes are available and known to the skilled person. For AFM, these modes for example include: tapping mode AFM (TM-AFM) wherein the probe is brought intermittently in contact with the surface and which may performed in combination with amplitude modulation AFM (AM-AFM) wherein the amplitude is kept constant, frequency modulation AFM (FM-AFM) wherein the resonance frequency of the probe is kept constant; and various sub-resonant modes wherein the probe is moved quasi-statically to and from the surface and the motion is adjusted to keep the maximum deflection constant.

In general, while the probe tip is scanned over a surface the tip experiences changes in forces and or topology. These changes impose attractive or repulsive force onto the cantilever resulting in a deflection of the cantilever towards or away from the surface. These deflections are typically sensed and used, for example to reconstruct stiffness information of the sample. In case the cantilever experiences large and/or step-wise changes in forces, for example as a result of a so-called snap-off event, the result is that a cantilever typically starts to oscillate, leading to noise in the measurement and/or to possible damage to sample and or tip. This so-called ringing may also occur during scanning of a tip along the surface of a sample to be measured, for example, in case the tip experiences large changes or step-wise changes in the topology of the sample surface. In order to generate accurate surface data, the scanning speed is typically balanced to find an optimum between scanning the surface at a reasonable scan speed whereby the cantilever is allowed sufficient time for unwanted cantilever oscillations to fade or damp out.

The ability of a cantilever to dissipate oscillations is typically referred to as the quality factor Q or damping factor and may be defined as the frequency-to-bandwidth ratio of the resonator; $Q=f_r/\Delta f$, where $f_r$ is the resonant frequency, $\Delta f$ is the full width at half maximum. The Q-factor is a dimensionless parameter that describes damping properties of an oscillator or resonator, whereby a cantilever with high Q requires little energy to bring into resonance but damps slowly, whereas a cantilever with low Q dampens faster but requires more energy to maintain an oscillation.

The present invention aims to mitigate one or more of the limitations of conventional systems and methods by providing a scanning probe microscope, a scan head for a scanning probe microscope, and a method for operating said scan head, which allows damping of unwanted cantilever oscillations using electrostatic interactions. By providing the scan head with a capacitor formed over a gap between a first electrode and a second electrode that is formed by the cantilever, a system is provided in which the position of the cantilever may be controlled in the electrostatic domain. By further providing the scan head with a resistor such as to form an RC circuit, undesired displacements and/or vibrations of the cantilever are damped resulting in improved damping efficiency. In other words, the present system is able to provide a means to probe a sample surface using cantilevers with lowered Q-factor, and/or in clamping cantilever oscillations without the need of active control.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

It is an object of the present invention to enable probing of a sample surface using a cantilever 1 with enhanced damping of unwanted cantilever oscillations in a scanning probe microscope 200.

Figure 1:
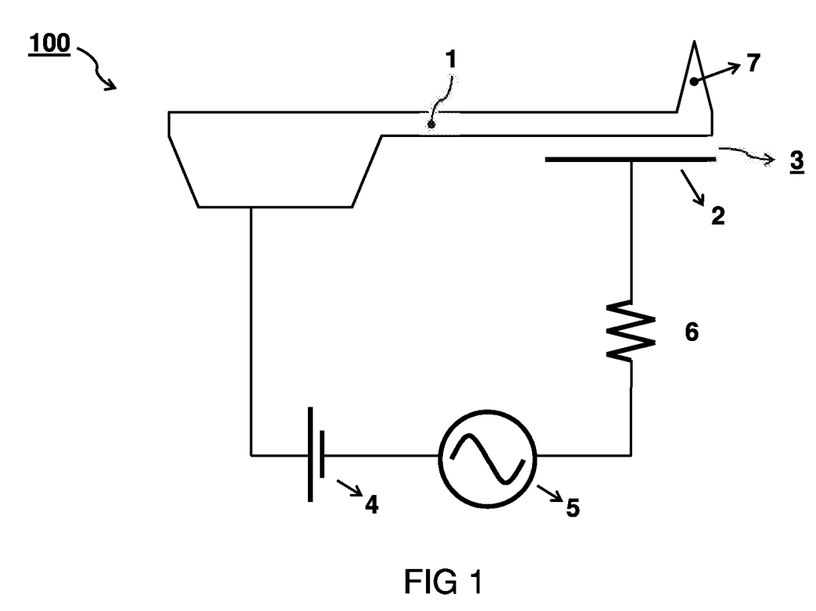
FIG. 1 schematically depicts an embodiment of a scan head for a scanning probe microscope provided with a RC circuit.

To this end, in accordance with a first aspect, there is provided a scan head 100 for a scanning probe microscope 200 arranged for moving a probe including a conductive cantilever 1 relatively to a substrate surface. Accordingly, the scan head 100 comprises: a first electrode positioned such that a capacitor 3 is formed across a gap between the first electrode 2 and a second electrode, wherein the second electrode is formed by the conductive cantilever 1; a voltage source 4,5 for actuating the conductive cantilever by applying a voltage to the capacitor; and at least a first resistor 6 arranged in series between the voltage source 4,5 and one of the first and second electrodes such as to form an RC circuit for damping a vibration of the cantilever 1. Accordingly, in some preferred embodiments the first electrode 2 may be provided with a means 13 to adjust the separation distance between cantilever 1 and first electrode 2. By adjusting the separation distance between cantilever and first electrode the capacitance of the formed capacitor may be increased or decreased. Alternatively or in addition the cantilever 1 and/or cantilever holder 11 may be provided with a means 13 for adjusting the separation distance between cantilever and first electrode. Such means may, for example be provided by mechanical adjustment means such as micromechanical screws, or by various electromechanical means such as piezo electric actuators.

In one embodiment, e.g. as shown in FIG. 1 the scan head 100 provided with a probe chip comprising a conductive cantilever 1 that has a probe tip 7. A first electrode 2 is positioned across a gap from the conductive cantilever 1 to form a parallel plate capacitor 3. A voltage source 4, 5 and a first resistor 6 are provided electrical connection with the capacitor 3 to form an RC circuit.

As indicated before, the capacitor is formed across a gap between a first electrode 2 and a second electrode formed by an electrically conductive cantilever 1. In one embodiment, the conductive cantilever 1 may be part of the scan head 100. In preferred embodiments the conductive cantilever 1 may be provided to the scan head 100 and exchanged at will, e.g. the cantilever may preferably be, or be part of a consumable. For this purpose the head 100 is preferably provided with a means for holding the probe chip 12. This means allows to securely fix the probe chip. In one embodiment said means may fixed to the head. Alternatively the means may be formed as a separate holder 11 which may be reversible secured to the scan head.

As indicated before the, the scan head 100 must be provided with a conductive cantilever 1. This may be in the form of a suitable commercially available consumable such as conductive probe chip comprising a conductive cantilever 1. The conductive cantilever 1 and/or conductive probe may comprise bulk electrically conductive properties, e.g. the cantilever 1 and/or probe chip may be formed of an electrically conductive material. Alternatively or in addition, the probe chip and/or cantilever 1 may be provided with an electrically conductive coating such as a thin gold or aluminum film. Advantageously, cantilevers 1 having a conductive coating, as well as cantilevers 1 having bulk-conductivity are commercially available. By positioning a first electrode such that a capacitor is formed across a gap between the first electrode 2 and a second electrode formed by at least part of a suitable commercially available conductive cantilever 1 a capacitor may be provided in a convenient and cost-effective way without the need of using cantilevers and/or probe chips comprising an integrated capacitor. It will be appreciated that the shape and design of the probes useful in the device and method according the invention are not limited to probes provided with a rectangular shape cantilever beams, also probes having other geometries such as triangular cantilevers and probes provided with integrated features such as conductive probe tips 7 and/or integrated actuation means such as piezo electric actuated cantilever beams, may be used.

By applying a voltage to the formed capacitor the cantilever 1 may be actuated electrostatically. By providing a suitable voltage the cantilever may be deflected towards or away from the first electrode 2. Accordingly, this principle may be used for moving a probe including a conductive cantilever 1 towards or away from the surface of a substrate to be probed 30. In an embodiment a voltage may first be applied to the capacitor for deflecting the cantilever towards the first electrode. That is for deflecting the conductive cantilever 1 away from the surface of a substrate to be measured 30. Subsequently, e.g. after a course approach stage to bring the cantilever 1 close to the surface of a substrate 30 to be measured, the voltage to the capacitor may be reduced so that the cantilever 1 moves towards the substrate 30 e.g. further approaches the sample.

Providing a potential to the capacitor may induce a static deflection to the cantilever 1, e.g. by providing a constant potential difference to the opposing plates of the capacitor. Alternatively, or in addition, an alternating potential may be applied to the capacitor such that the cantilever 1 may be oscillated at a target frequency. In this way the cantilever 1 may, for example, be driven at or close to one of its resonance frequencies. The cantilever may also be driven over a frequency range, e.g. a frequency sweep. By driving the cantilever 1 electrostatically it is possible to provide a clean resonance in comparison to a cantilever that is driven by a dither piezo, e.g. as in conventional systems. In some preferred embodiments a scan head 100, and/or scanning probe microscope 200 may be provided in which the dither piezo is eliminated.

Without being bound to theory it is believed that for normal electrostatic actuation the electrostatic force is proportional to the voltage V squared and inversely proportional to the gap g squared. In case of an ideal parallel plate arrangement the electrostatic force FE may accordingly be expressed as:

$$F_E = -\frac{Q^2}{2\varepsilon_0 A}$$

wherein, Q represents the charge over the capacitor in Coulomb, $\varepsilon_0$ represents the permittivity of the medium between the capacitor plates, e.g. air, in Farad per meter, and A represents the area of the electrodes over which the capacitor is formed. With Q being proportional to V times the capacity C, and the capacity being inversely proportional to the separation distance, or gap g, the equation of motion of a resonating cantilever can be rewritten to:

$$F_E = -\frac{\varepsilon_0 A V^2}{2(g_{init} - g)^2} = m\ddot{g} + d\dot{g} + kg$$

wherein, $g_{init}$ and g respectively represent the gap distance in rest and the gap distance of the cantilever displaced from its rest position, and wherein m, k, and d respectively represent resonator mass, cantilever stiffness, and a damping coefficient.

However, since the basis attractive force is based on the charge, it is believed that voltage follows from charge and distance rather than the other way around. When the electrodes mode, e.g. when the cantilever is deflected due to interactions with the sample to be measured, charge Q will not be instantaneously replenished to keep the voltage constant. In fact, it is believed that the charge has to flow through the resistor to reach the capacitor and is accordingly subject to a time constant, which corresponds to the so-called RC time of the system. The electrostatic RC time may be compared to the time-constant of a classical spring-mass system.

Since charge on the electrodes lags voltage there is an according phase shift for a periodic signal. The charge lag further reduces the electrostatic force compared to a steady state force, which is believed to contribute to the herein disclosed increased damping effect. According to a first aspect of the invention, the resistance of the resistor may be used to control the damping, e.g. the damping coefficient, of the cantilever.

In accordance to the first aspect, the first resistor 6 is arranged in series with the capacitor to provide a RC time suited to control damping of the cantilever 1. Preferably, the first resistor 6 may be positioned close to the capacitor. In some embodiments the first resistor 6 may be provided in electrical contact with to the first electrode. Alternatively or in addition, the first resistor 6 may be provided in electrical contact with the second electrode, e.g. the conductive cantilever 1. Optionally, the first resistor 6 may be formed of a plurality of resistors. Optionally, the first resistor 6 may be provided reversibly. Optionally, the first resistor 6 may be provided or integrated into a probe chip holder 11. Alternatively or in addition, a specially designed probe chip with integrated resistors may be provided. By providing the resistor on a consumable such as the probe chip or the probe chip holder, the resistor may be exchanged easily and its resistance may be tuned to the specific cantilever type or design required by a given measurement methods.

Providing a resistor 6 with too low resistance in the RC circuit may provide low or limited damping effect onto the resonance of a given cantilever and/or electrostatically induced spring softening. Providing a resistor 6 with too high resistance in the RC circuit may result in a slow response to voltage adjustment and/or a loss of dampening of motion due to external forces to a given cantilever 1. This may be accompanied by a resonance shift to lower frequencies along with increasing resonance amplitudes, e.g. decreased damping. Preferably, for a given cantilever 1 with a given spring constant, the resistor 6 is provided with a resistance suited to provide near critical damping of said cantilever.

Figure 2:
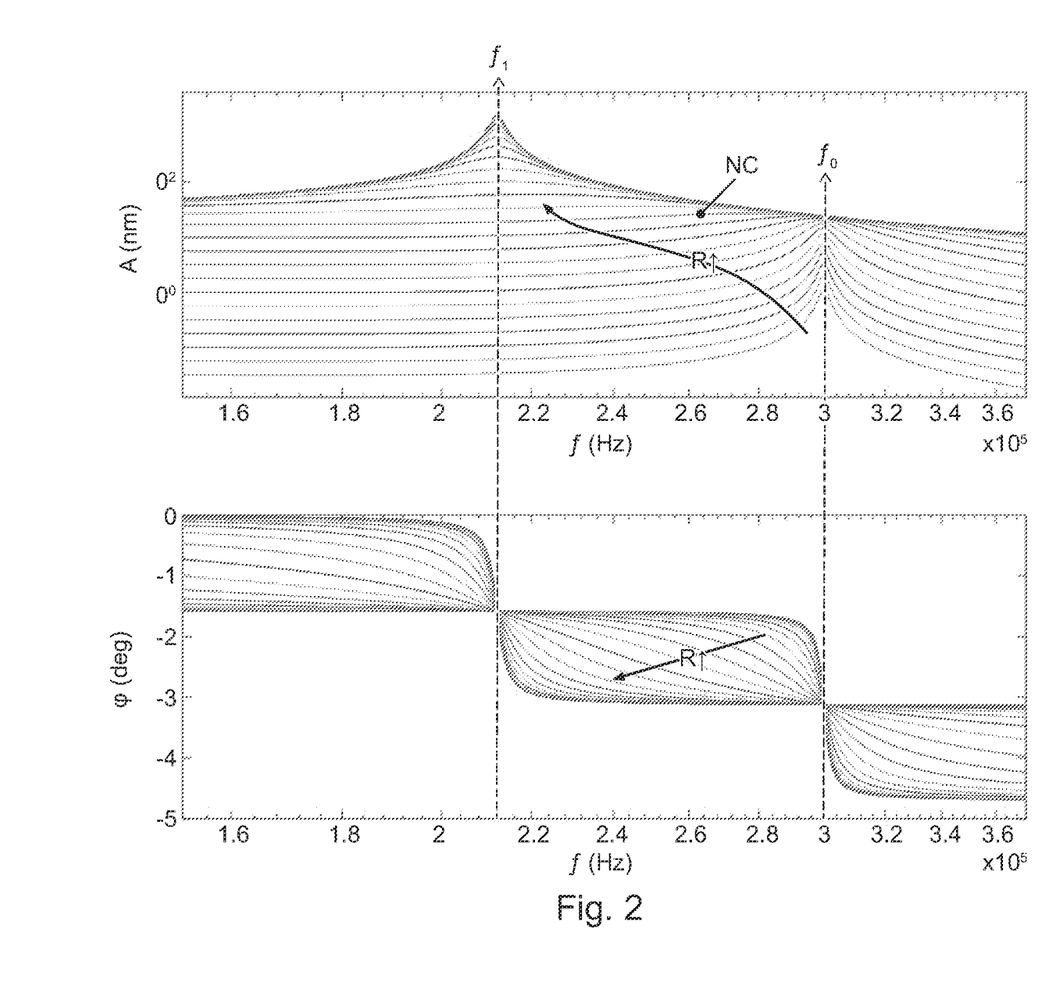
FIG. 2 schematically illustrates resonance amplitude and phase shift as a function of drive frequency for a cantilever that is electrostatically damped by an RC circuit.

FIG. 2 depicts modelled resonance spectra of a cantilever 1 having a stiffness of 40 N/m and a resonance mode at a frequency at 300 kHz used in an embodiment of the scan head 100 according to the invention, e.g. as in FIG. 1. The top spectrum shows the determined amplitude for this cantilever that driven electrostatically over a range of frequencies ranging between approx. 160 and 360 kHz. The bottom spectrum shows the corresponding phase response. The response is plotted for a system in which the resistance R of the first resistor 6 is varied over a range from zero to 10 GΩ. The direction of the arrow indicates increasing resistance of the first resistor. From FIG. 2 (top) it can be observed that resonance amplitude of the cantilever increases with decreasing resistance. At the same time the resonance peak broadens indicative of a decreased Q factor, e.g. improved damping. Initially, the resonance frequency remain close to the initial resonance frequency f0 at 300 kHz. Upon decreasing the resistance R of the first resistor 6, it can be observed that the resonance of the cantilever 1 shifts to lower frequencies f1 due to spring softening and the damping effect is gradually reduced. At a position between both extremes, indicated NC, the cantilever 1 may be driven with near critical clamping.

Improving the damping of the cantilever 1 will reduce the Q-factor, e.g. increase the cantilever bandwidth. Increasing the cantilever bandwidth may dampen unwanted oscillations in a cantilever 1, for example resulting from step-wise changes in interaction forces between the surface of a sample 30 and a cantilever 1 comprising a probe tip 7 probing said surface. Improved damping may enable faster scanning, e.g. faster probing, of the surface of a sample to be probed. It will be appreciated that cantilever bandwidth varies between cantilevers 1, for example between cantilevers 1 having differing stiffness. Therefore, in another or further preferred embodiment the resistance of the resistor 6 is preferably adjustable. For this purpose the first resistor 6 preferably is a tunable resistor 6, preferably within a range from 1 MΩ and 10 MΩ, more preferably in a range between 100 kΩ to 100MΩ, even more preferably in a range between 10 kΩ to 1 GΩ, most preferably in a range between 1kΩ to 10 GΩ. By providing a resistor 6 with an adjustable resistance, the resistance may be adjusted according to the properties, e.g. stiffness and/or dimension, of the cantilever 1 to be used. Providing a resistor with an increasingly large tuning range increases the flexibility of the system. Alternatively, or in addition the first resistor 6 may be a switchable resistor 6 comprising an array of selectable and/or tunable resistors 6. By forming the first resistor 6 from an array of selectable and tunable resistors 6 a resistor 6 may be provided of which the resistance may be tuned with high precision over a broad range.

Preferably, the capacitance of the capacitor formed across a gap between the first electrode 2 and the second electrode formed by the cantilever 1 is such that the influence of parasitic capacitances in the system may be neglected. Therefore, the first 2 and second electrode are preferably positioned such that a capacitor with a relatively large capacitance is formed. Since the area facing the first electrode 2 for commercial cantilevers 1 is typically flat, and since capacitance at a given separation distance scales with overlap area, the surface of the first electrode 2 is preferably also flat such as to form a parallel plate capacitor.

Figure 3A:
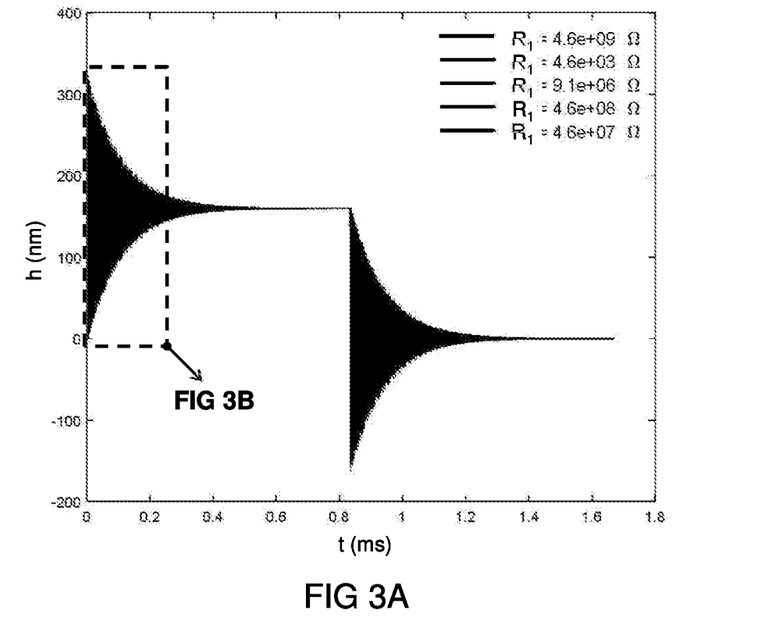
FIGS. 3A and 3B schematically show the damping may be controlled by adjusting the resistance in the RC.
Figure 3B:
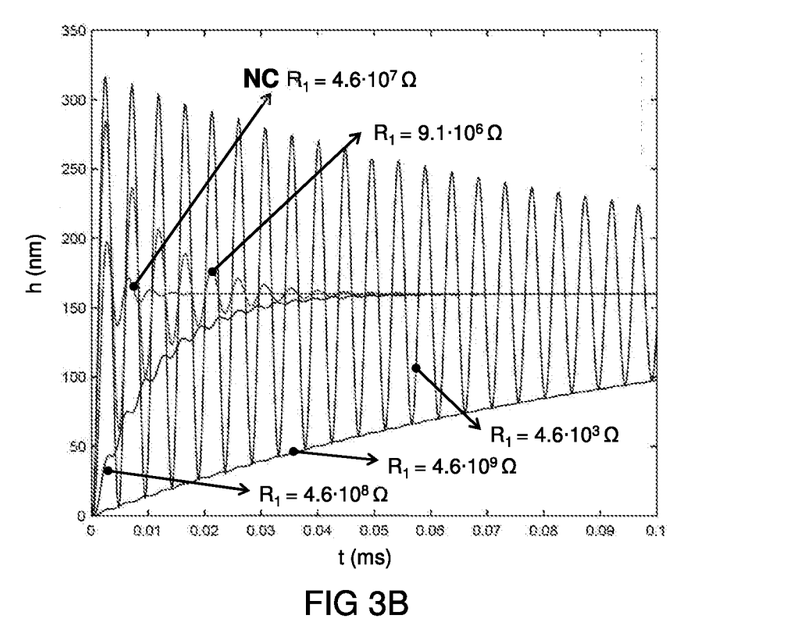

FIGS. 3A and B depict the oscillation amplitude of a cantilever 1 as a function of time according to an embodiment of the invention. In FIG. 3A, the damping response of cantilever 1, having the properties according to the system discussed in FIG. 2, is illustrated following a simulated response to a step-wise actuation at times 0 and 0.8 ms. As discussed before, in relation to FIG. 2, the damping properties, e.g. the damping coefficient of the cantilever 1, can be tuned by changing the resistance of the first resistor 6. This is illustrated for five resistances R1 ranging from approximately 4.6 kΩ to 4600 MΩ. FIG. 3B shows the individual responses in more detail. As can be seen, damping of a system wherein the first resistor 6 has a resistance of 4.6 kΩ is slow; 0.1 ins after triggering ringing with an amplitude in the order of 40% of the initial magnitude remains present. Increasing the resistance to exceedingly high values, e.g. to 4600 MΩ, results in over-damping of the cantilever 1 as can be observed in the graph. In contrast, optimal damping may be achieved by optimizing the resistance of the first resistor 6. In this case, a resistance of 460 MΩ leads to a fast damping of the oscillations, e.g. ringing. By selecting a suitable value of the resistance the cantilever may be operated under near-critical damping conditions NC. As a result unwanted oscillations of the cantilever 1 may be damped quickly, e.g. within 0.02 ms, allowing fast SPM operation. As can be seen for in FIG. 3B, the resistance may be set within a rather broad range. Even when the resistance is set a factor 10 higher or lower, e.g. in a range between 46-4600 MΩ, a large damping effect has still been observed.

Figure 5A:
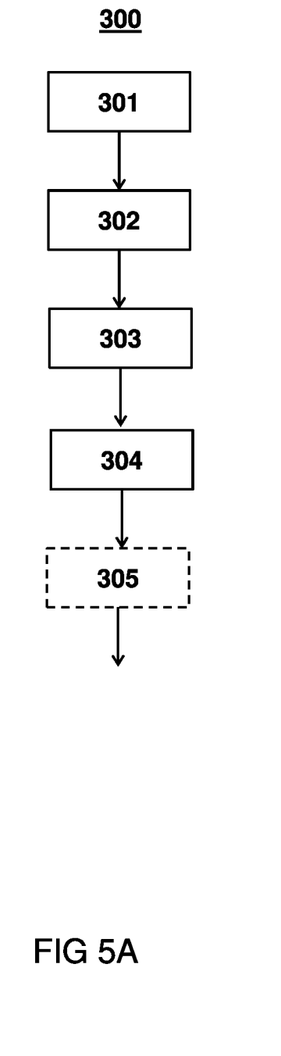
FIG. 5A schematically depicts a method for finding an optimal, or near-optimal resistance of the first resistor.

Accordingly, in some preferred embodiments it is preferred to operate the cantilever 1 at near critical damping conditions. Operation at near critical damping conditions may be achieved by tuning the RC time of the system. This can be done by adjusting, e.g. selecting and/or tuning, the resistance of the first resistor 6. To find an optimal, or near-optimal resistance of the first resistor 6 for a given cantilever 1 a method as described in relation to FIG. 2 may be followed. Such method, e.g. as shown in FIG. 5A comprises the steps of: providing a probe 301; driving the cantilever to oscillate 302; sweeping the drive frequency around a range a resonance frequency of the cantilever 303; measuring resonance amplitude and/or phase signal 304; optionally changing the resistance of the first resistor if needed 305; optionally, if needed, repeating the sweeping, measuring, and changing steps at least until a suitable resistance is found at which cantilever damping is a to a desired level. Preferably said driving is performed in a range enclosing a resonance frequency and the corresponding resonance that is shifted due to electrostatically induced spring softening. Said driving may be performed using known means, such as a dither piezo, or by using piezo resistively actuated cantilevers 1. Preferably, driving the cantilever 1 may be performed electrostatically. Optionally, a suitable the method may comprise determining a suitable starting resistance for first resistor 6. Such value may be based on previous data using obtained for similar cantilevers. Alternatively a suitable value may be calculated, or estimated, e.g. using specified or determined cantilever properties such as stiffness, resonance frequency, anchor structural cantilever properties as mass, dimension, and/or thickness. More specifically, a resistance may be chosen such that the product of series resistance and the capacitance formed by the cantilever and actuation electrode (i.e. the RC-time) is equal to 1 divided by $2\pi$ times the resonance frequency of the cantilever (i.e. $\frac{1}{2\pi f_{resonance}}$).

Figure 4A:
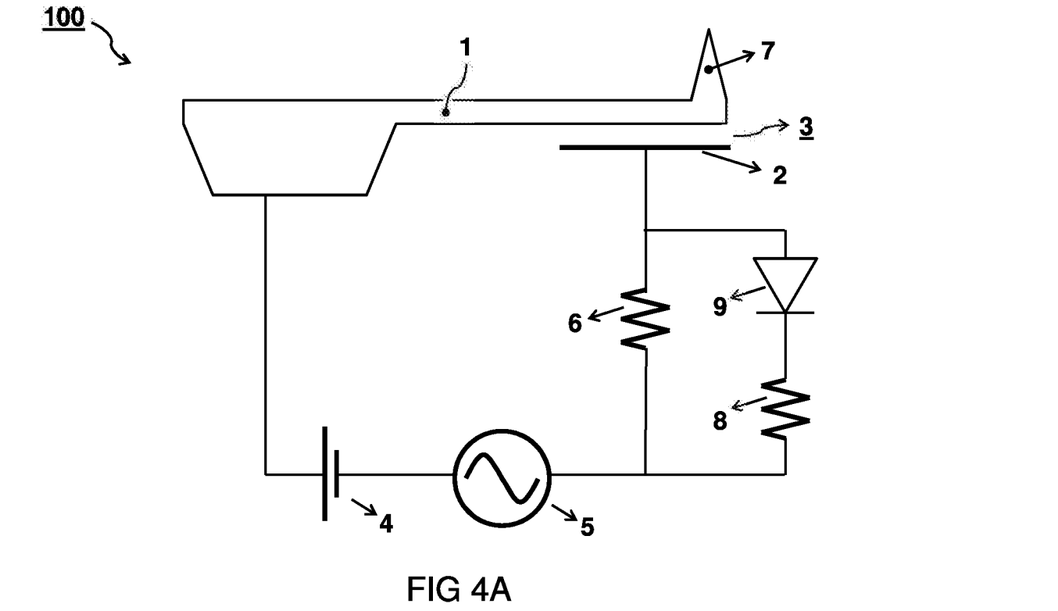
FIG. 4A schematically depicts an embodiment of a scan head according to the invention further provided with a diode and second resistor.

In another or further preferred embodiment, e.g. in the embodiment as shown in FIG. 4A, the scan head 100 further comprises a diode 9 and second resistor 8 arranged in a (electrical) circuit parallel to the first resistor 6. By providing the RC circuit with a diode 9 and second resistor 8 arranged parallel to the first resistor 6, damping may be directional depending on the orientation of the diode. Preferably, the resistance of the second resistor 8 is smaller than the resistance of the first resistor 6 such that charge transported to and from the capacitor the via the part of the circuit comprising the diode 9 may be faster than charge transport via the part of the circuit comprising the first resistor 6. For example, the diode 9 may be arranged such that a resonating cantilever 1 is only damped during a phase of the oscillation in which the cantilever approaches the surface of a sample 30 that is to be probed. Alternatively, the diode 9 may be positioned such that damping occurs during a withdrawing phase of the oscillation, e.g. during a phase of the oscillation in which the cantilever 1 moves away from the surface of a sample 30 that is to be probed. It will be appreciated that the second resistor 8, in accordance with the first resistor 6, may preferably be formed from a adjustable resistor and/or and array of selectable resistors.

To sense the cantilever 1 position, for example during a scanning the surface of a sample or surface to be measured, the capacitance may be measured. A cantilever 1 deflecting towards the first electrode, for example induced by the tip 7 interacting with a protrusion on a sample 30 surface, will lead to a decreased separation between first 2 and second electrode, and accordingly to an increased measured capacitance. Conversely, a probe tip 7 following a depressing the topology during the scanning of a sample 30 may lead to the cantilever 1 deflection away from the first electrode 2 as indicated by a decreased measured capacity.

In another or further preferred embodiment the scan head 100 comprises an electronic read-out means 10 connected to the RC circuit for determining a position of the cantilever. To sense the cantilever 1 position, the capacitance can be measured. This may be done using e.g. an RF resonator or a single frequency 1-port S-parameter measurement system. Preferably, the read-out circuitry is de-coupled from the actuation circuitry to reduce mutual interference. For this reason, a decoupling capacitor 18 may be provided that connects the cantilever-actuator capacitor to the read-out circuitry. It will be appreciated that other means to decouple the read-out circuitry from the actuation circuitry are envisioned as well. Preferably, the capacitance of said decoupling capacitor 18 is comparable to the capacitance between cantilever 1 and the first electrode, e.g. actuation electrode 2.

Alternatively or in addition, the first electrode, e.g. actuation electrode 2 can be made from an optically transparent material. By providing the system with an optically transparent first electrode 2, e.g. driving electrode, a position of the cantilever may be determined using known optical sensing methods such as optical beam deflection and interferometry.

The present invention further or additionally relates to providing a means for reducing thermal vibrational noise by electrostatically damping. Without being bound to theory it is believed that the efficiently of electrostatic damping of thermal noise is limited by thermal noise in the RC circuitry. Accordingly, other or further preferred embodiments comprise a means to cool the first resistor 2 to reduce thermal vibrational noise, e.g. thermal cantilever vibration. Optionally, the first 2 and second resistor may be cooled. With decreasing resistor temperature thermal noise is increasingly reduced. Without being bound to theory, it is believed that the maximum attainable noise reduction of a cooled system compared to a system at room temperature scales with $\sqrt{(293/T\_resistor)}$. Suitable means for cooling the first and/or second resistor include but are not limited to Peltier elements and liquid nitrogen cooling.

Figure 5B:
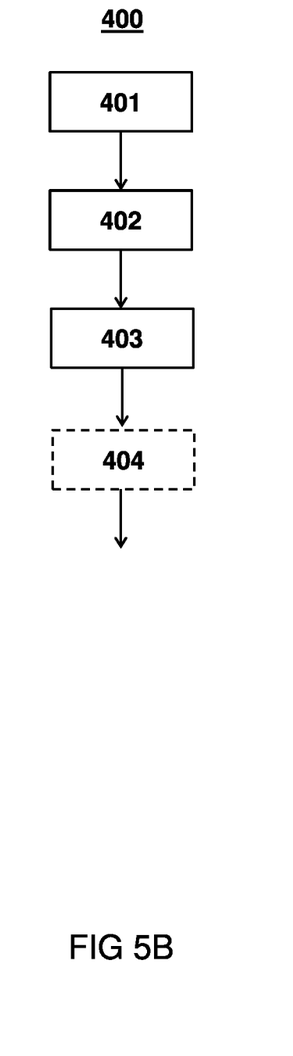
FIG. 5B schematically depicts a method for moving a probe including a conductive cantilever relative to a substrate surface.

According to a further aspect, there is provided a method 400, e.g. as shown in FIG. 5B, for moving a probe including a conductive cantilever 1 relatively to a substrate surface 30. Said method comprises:

positioning 401 a first electrode 2 such that a capacitor is formed across a gap between the first electrode 2 and a second electrode, wherein the second electrode is formed by the conductive cantilever 1;

applying 402 a voltage to the capacitor for actuating the conductive cantilever 1; and providing 403 at least a first resistor 6 arranged in series between the voltage source 4,5 and one of the first 2 and second electrodes such as to form an RC circuit for damping a vibration of the cantilever 1.

The method preferably further comprises choosing, setting or selecting 404 the resistance of the first resistor 6 such that the characteristic RC time matches a resonance frequency of the cantilever 1 by a factor within a range from 0.1 to 10 to improve damping of cantilever oscillations, e.g. oscillations due to probing of step changes in said substrate surface 30.

More preferably, the RC time matches a resonance frequency of the cantilever 1 by a factor within 0.5 to 2, most preferably close to 1, e.g. between 0.9 and 1.1. By closely matching the RC time to a resonance frequency of the cantilever 1, the system may be operated under critical or near-critical damping conditions. Critical cantilever damping may improve cantilever response speed, such that damping is essentially within 0.02 ms or even fast e.g. within 0.01 ms, even down to 0.001 ms. Advantageously, damping cantilever oscillations, e.g. within 0.02 ms, may allow operation of an imaging mode, e.g. raster scanning the probe, at a rate of around 100 lines per second using 512 sampling points per line.

Figure 5C:
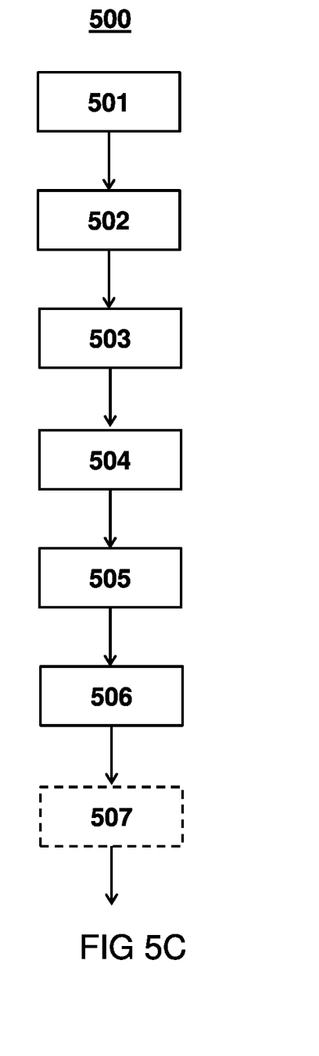
FIG. 5C schematically depicts a method for probing a substrate surface using sub-resonant imaging with force control.

The present invention further relates to a method 500, e.g. as shown in FIG. 5C, for probing the substrate surface using sub-resonant imaging with force control, e.g. analyzing the surface of a sample 30 to be measured using a sub-resonant imaging mode with force control. As explained before, the voltage on the capacitor 1 may be used to drive the cantilever 1 away from the substrate 30. Subsequent reduction of such bias voltage may move the cantilever towards the substrate 30. Accordingly, the provided method comprises:

- Reducing 501 a voltage applied to the capacitor for driving the conductive cantilever 1 towards the surface of the substrate 30 such that the conductive cantilever 1 deflects;
- measuring 502 the cantilever position;
- comparing 503 the measured cantilever position with pre-recorded reference data obtained with the cantilever 1 at a distance from the substrate 30 with essentially zero interaction between cantilever and substrate, the data comprising the position of the cantilever 1 as function of provided actuation voltage;
- calculating 504 an applied force to the substrate 30 using the position deviation from the reference data and a spring constant of the provided cantilever 1;
- closing a 505 feedback loop that adjusts the voltage to control the force applied to the substrate 30 using a force setpoint;
- periodically 506 adjusting the applied force setpoint.

Advantageously, said method 500 may be used to scan an area of the surface of a sample 30. Since, the cantilever 1 may be driven at, or near-to a critical damping frequency, unwanted cantilever oscillations are damped faster compared to systems providing no additional damping. In other words, cantilever ringing, e.g. resulting from generating or loosing contact between a probe tip and the sample surface is minimized, thereby allowing improving attainable scan speeds. Optionally the method 500 may further comprise adjusting 507 the cantilever spring constant using the electrostatic spring softening effect. This may allow setting or tuning the applied force during operation with improved accuracy.

In another or further preferred embodiment, the scan head 100 comprises a means 12 arranged to hold the cantilever or probe chip comprising a cantilever 1 with minimal parasitic capacitance. By minimizing parasitic capacitances the cantilever can be more effectively damped. As such, it is advantageous not to use a metal mechanical clamp, e.g. to reduced the total area of unshielded conductive surfaces in the circuit. To this end the scan head 100 may be provided with a vacuum chuck 12 for holding the probe chip. Optionally the vacuum chuck may be provided into the probe holder 11.

According to a further aspect, the present invention relates to a probe holder 11 for holding a conductive cantilever 1 for use in a scanning probe microscope 200, the holder 11 comprising a first electrode 2 positioned such that a capacitor may be formed across a gap between the first electrode and a second electrode, e.g. upon placing a conductive cantilever 1.

According to a further aspect there is provided a scanning probe microscope 200 comprising the head according to the invention.

Figure 4B:
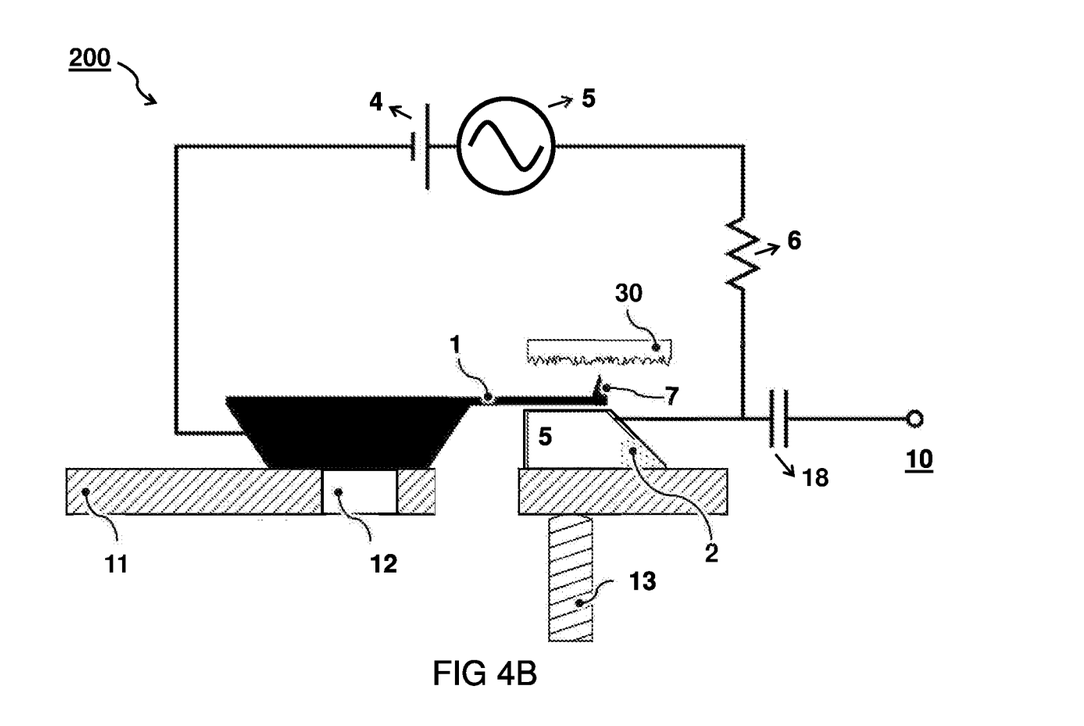
FIG. 4B schematically depicts a scanning probe microscope.

FIG. 4B schematically depicts an embodiment of a scanning probe microscope 200 according to the invention provided with a probe and a probe holder 11, along with a sample to be measured 30. Indicated in the figure are: conductive cantilever 1 comprising a probe tip 7; optically transparent second electrode 2, voltage source 4,5; first resistor 6; read-out 10 circuitry with a de-coupling cap acitator; probe holder 11 comprising a vacuum chuck 12; and mechanical positioning means 13.

It will be appreciated that other scanning probe microscopes 200, probe holders 11, scan heads 100, and or assemblies comprising combinations thereof are envisioned as well, so long these allow positioning a conductive cantilever 1 such that a capacitor is formed across a gap between a first electrode 2 and a second electrode, wherein the second electrode is formed by the conductive cantilever 1, and so long these provide a voltage source 4,5 for actuating the conductive cantilever 1 by applying a voltage to the capacitor; and so long these comprise at least a first resistor 6 arranged in series between the voltage source 4,5 and one of the first and second electrodes such as to form an RC circuit for damping a vibration of the cantilever 1. For example, in one or more embodiments the voltage source 4,5 may be provided as a separately connectable unit. Also, the first electrode may be provided on any component of an SPM system, e.g. the head 100, sample holder 11, so long a capacitor may be formed across a gap between the first electrode 2 and a conductive cantilever 1. Accordingly, the invention further relates to a scanning probe microscope 200, wherein one of the scan head 100, probe chip holder 11, or a combination there of comprises: a first electrode 2 positioned such that a capacitor is formed across a gap between the first electrode 2 and a second electrode, wherein the second electrode is formed by the conductive cantilever 1; a voltage source 4,5 for actuating the conductive cantilever 1 by applying a voltage to the capacitor; and at least a first resistor 6 arranged in series between the voltage source 4,5 and one of the first 2 and second electrodes such as to form an RC circuit for damping a vibration of the cantilever 1. Additionally, the present invention relates to an assembly of a probe comprising a conductive cantilever 1 and a scan head 100 according to the invention.

The invention claimed is:

1. A scan head for a scanning probe microscope arranged for moving a probe, including a conductive cantilever, relatively to a substrate surface, the scan head comprising:
- a first electrode positioned such that a capacitor is formed across a gap between the first electrode and a second electrode, wherein the second electrode is formed by the conductive cantilever;
- a voltage source for actuating the conductive cantilever by applying a voltage to the capacitor formed between the first electrode and the second electrode; and
- at least a first resistor arranged in series between the voltage source and either one of the first electrode and the second electrode so as to form an RC circuit for damping a vibration of the conductive cantilever.

2. The scan head according to claim 1, wherein the resistor is arranged to provide an RC time suited to enhance damping of the conductive cantilever.

3. The scan head according to claim 1, wherein the resistance of the first resistor is adjustable.

4. The scan head according to claim 3, wherein the first resistor is:
- a tunable resistor; or
- a switchable resistor comprising an array of selectable resistors.

5. The scan head according to claim 1, wherein the capacitor is a parallel plate capacitor.

6. The scan head according to claim 1, further comprising a diode and second resistor combination that are arranged in a parallel electrical path to the first resistor.

7. The scan head according to claim 1, comprising an electronic read-out that is connected to the RC circuit for indicating a position of the cantilever.

8. The scan head according to claim 7, wherein the scan head preferably further comprises a decoupling capacitor that matches the capacitance between cantilever and first electrode.

9. The scan head according to claim 1, wherein the first electrode is optically transparent to enable an optical read-out of cantilever position.

10. The scan head according to claim 1 comprising a cooling element that provides cooling for either the first resistor or both the first resistor and the second resistor, thereby reducing thermal vibrational noise.

11. A scanning probe microscope comprising the scan head according to claim 1.

12. An assembly of a probe comprising a conductive cantilever and a scan head according to claim 1.

13. A method for moving a scanning probe, including a conductive cantilever, relatively to a substrate surface comprising:
    positioning a first electrode such that a capacitor is formed across a gap between the first electrode and a second electrode, wherein the second electrode is formed by the conductive cantilever;
    actuating the conductive cantilever by applying a voltage to the capacitor between the first electrode and the second electrode; and
    providing at least a first resistor arranged in series between the voltage source and either one of the first electrode and the second electrode so as to form an RC circuit for damping a vibration of the conductive cantilever.

14. The method according to claim 13, further comprising choosing, setting or selecting the resistance of the first resistor such that the characteristic RC time matches a resonance frequency of the cantilever by a factor within a range from 0.1 to 10 to enhance damping of cantilever oscillations arising from probing step changes in the substrate surface.

15. The method according to claim 14, wherein the RC time matches a resonance frequency of the cantilever by a factor within 0.5 to 2.

16. The method according to claim 15, wherein the RC time matches a resonance frequency of the cantilever by a factor close to 1 so as to operate the cantilever in a, or in a near, critical damping mode.

17. The method according to claim 13 for further probing the substrate surface using sub-resonant imaging with force control, wherein the method further comprises:
    reducing a voltage applied to the capacitor for driving the conductive cantilever towards the surface of the substrate such that the conductive cantilever deflects;
    obtaining a measured cantilever position by measuring, in association with the reducing, the cantilever position;
    comparing the measured cantilever position with pre-recorded reference data obtained with the cantilever at a distance from the substrate with essentially zero interaction between cantilever and substrate, the pre-recorded reference data comprising the position of the cantilever as function of provided actuation voltage;
    calculating an applied force to the substrate using:
        a position deviation determined the comparing the measured cantilever position with the pre-recorded reference data, and
        a spring constant of the provided cantilever;
    closing a feedback loop that adjusts the voltage to control the force applied to the substrate using a force setpoint; and
    periodically adjusting the applied force setpoint.

18. A probe chip holder configured to reversibly hold an SPM probe chip with a conductive cantilever for use with a scan head for a scanning probe microscope arranged for moving a probe, including a conductive cantilever, relatively to a substrate surface,
    wherein the scan head comprises:
        a first electrode positioned such that a capacitor is formed across a gap between the first electrode and a second electrode, wherein the second electrode is formed by the conductive cantilever;
        a voltage source for actuating the conductive cantilever by applying a voltage to the capacitor formed between the first electrode and the second electrode; and
        at least a first resistor arranged in series between the voltage source and either one of the first electrode and the second electrode so as to form an RC circuit for damping a vibration of the conductive cantilever;
    wherein the probe chip holder comprises the first electrode that is positioned such that the capacitor is formed across the gap between the first electrode and the second electrode, and
    wherein the second electrode is formed by the conductive cantilever.

19. The probe chip holder according to claim 18, wherein the probe chip holder is configured to adjust a separation distance between the cantilever and the first electrode.

20. The probe chip holder according to claim 18, wherein the probe chip holder further comprises the first resistor.

* * * * *